UNITED STATES PATENT OFFICE.

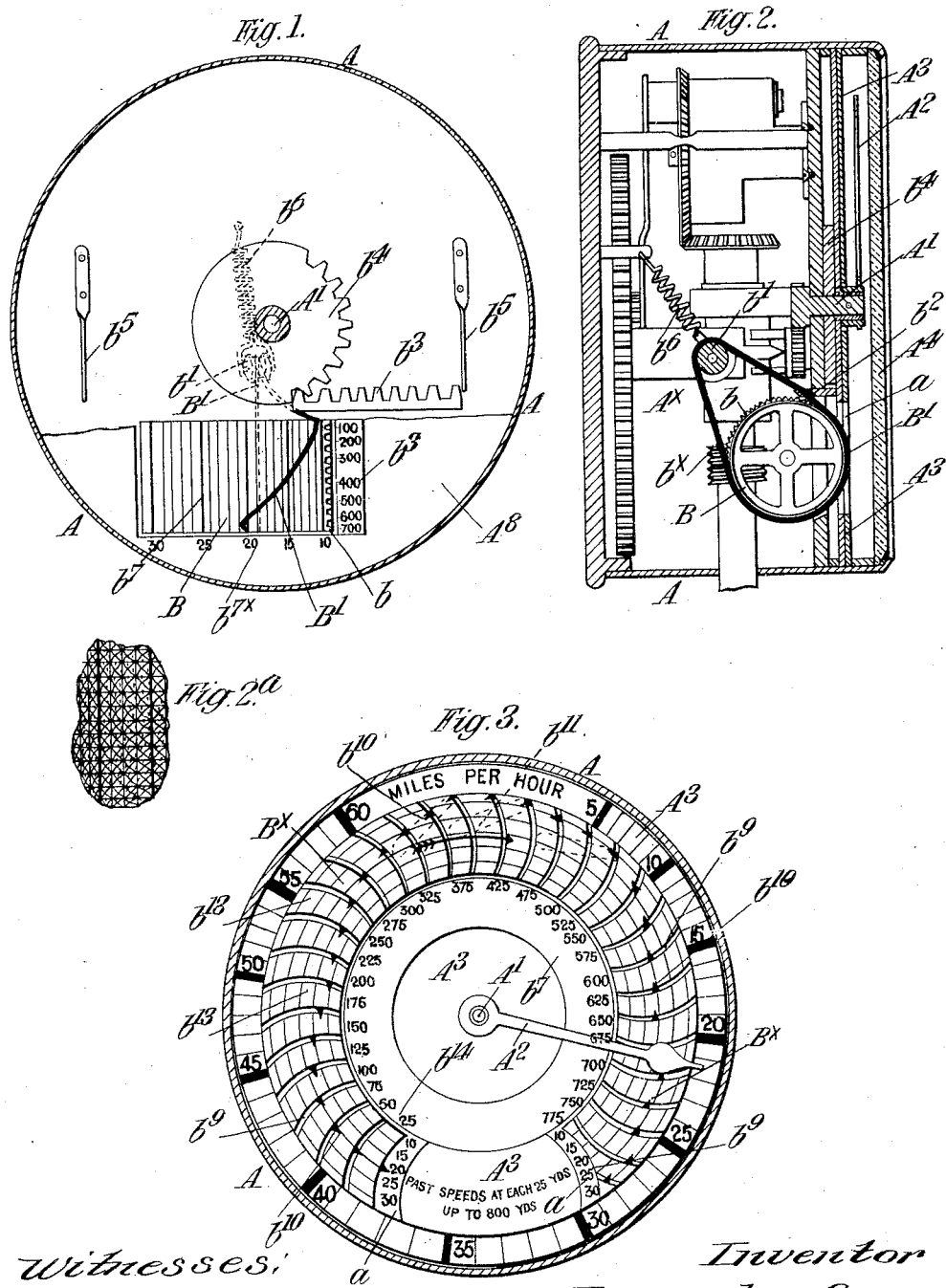

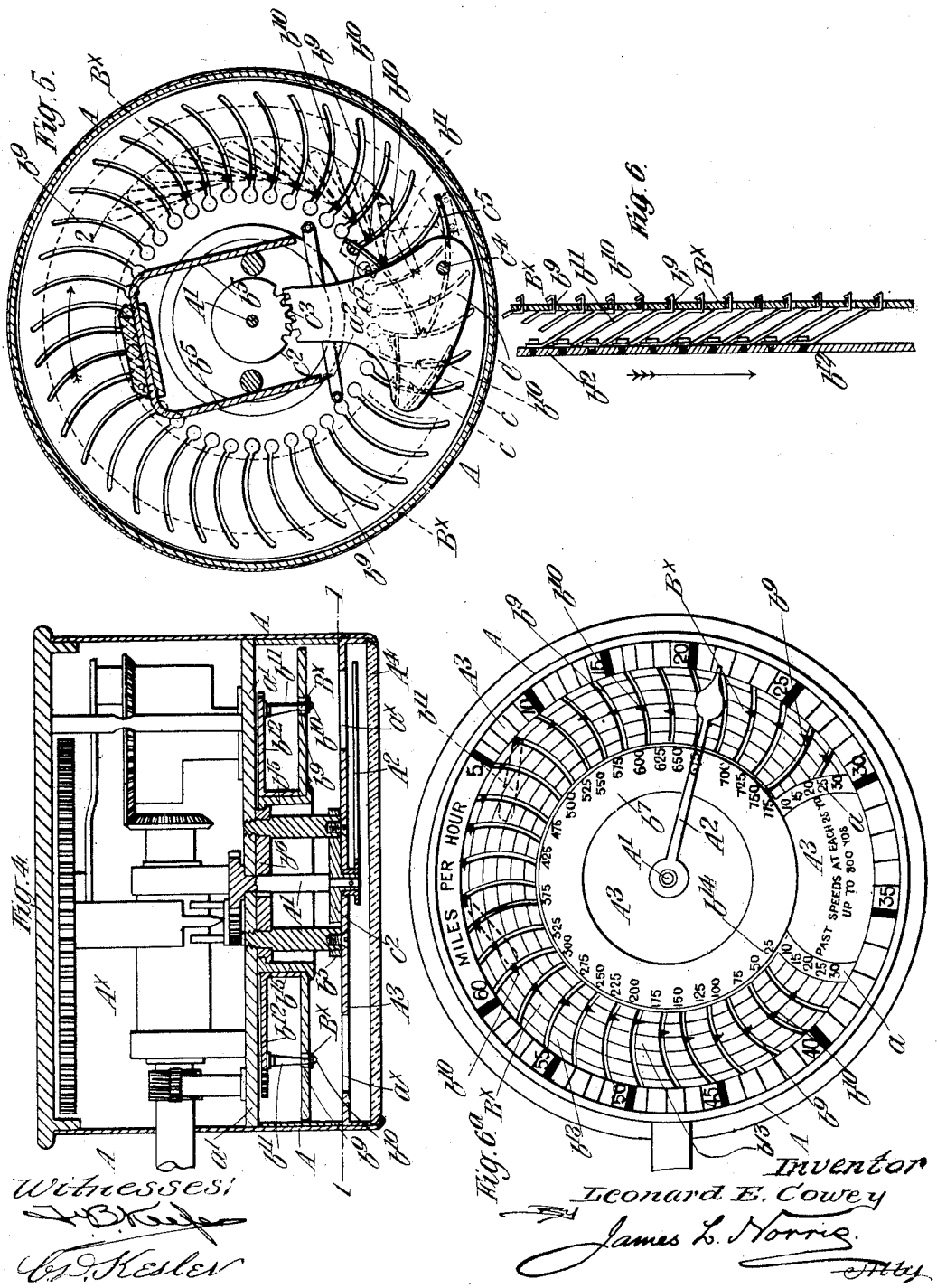

LEONARD EUGENE COWEY, OF BRONDESBURY, ENGLAND.

APPARATUS FOR INDICATING OR RECORDING SPEED.

No. 897,715.  Specification of Letters Patent.  Patented Sept. 1, 1908.

Application filed October 26, 1905. Serial No. 284,524.

*To all whom it may concern:*

Be it known that I, LEONARD EUGENE COWEY, a subject of the King of Great Britain, residing at 10 Exeter Mansions, Brondesbury, in the county of Middlesex, England, engineer, have invented certain new and useful Improvements in and Relating to Apparatus for Indicating or Recording Speed, of which the following is a specification.

This invention relates to apparatus for indicating or recording speed and is more particularly intended for use with motor-cars, electric trams and similar vehicles.

In speed recording apparatus as at present generally constructed it is usual to cause a web or continuous length of paper or similar material to travel in proximity to a pencil or other form of stylus which is arranged to bear against the surface of the traveling paper and in accordance with variations in the speed of the vehicle to trace a line on said paper relatively to marks representing degrees of speed. A continuous record is thus obtained of the behavior of the vehicle with respect to speed during any particular run or journey. As however it is only necessary to refer to this record in the event of a dispute arising as to the speed of the vehicle at a particular time or incident, it is a needless incumbrance to the vehicle to carry the somewhat bulky and heavy apparatus which is requisite for keeping a continuous record.

It is the chief object of my invention to provide an indicating or recording apparatus which will continually record the speed of the vehicle but which will only retain such record for a certain length of time, that is to say until a given distance has been traveled by the vehicle, beyond the point at which such record was formed, the records previous to this given distance being automatically obliterated by the working of the apparatus. I can thus avoid the unnecessary accumulation of the records and make the apparatus in a compact and light form.

In order that my said invention may be clearly understood and readily carried into effect I will describe the same more fully with reference to the accompanying drawings, in which:—

Figure 1 is a sectional front elevation and Fig. 2 a vertical section of one form of my apparatus. Fig. 2$^a$ is an enlarged detail view. Fig. 3 is a front elevation, and Fig. 4 a horizontal section of another form of my apparatus. Fig. 5 is a vertical section taken approximately on the line 1. 1. of Fig. 4. Fig. 6 is a developed section taken approximately on the line 2. 2. of Fig. 5. Fig. 6$^a$ is a front elevation showing the device illustrated in Figs. 3, 4, 5 and 6 as it appears when actually in use.

In all these figures like letters of reference indicate similar parts.

A is the casing of the apparatus.

A′ is the spindle that carries the speed indicating pointer A$^2$ and that may receive its motion from speed indicating mechanism A$^\times$ of the kind set forth in the specification of my prior United States patent No. 797,500 dated August 15th, 1905. The said pointer A$^2$ travels over a graduated dial A$^3$ which is covered by a glass or other transparent plate A$^4$ affixed to the front of the casing in the ordinary manner.

Referring first more particularly to Figs. 1 and 2, B is a slowly revolving member in the form of a drum or cylinder which receives its motion from the traveling vehicle through any suitable kind of mechanism such as a worm $b^\times$ gearing with a toothed wheel $b$ on said drum.

B′ is an endless elastic or other suitable resilient band or cord which revolves in a path around the drum or cylinder B at right angles to the longitudinal axis thereof and which is capable of being deflected from such path in accordance with variations in the speed of the vehicle. The surface of the said drum or cylinder is roughened serrated or otherwise formed to enable the band to grip the drum and retain any position it is caused to assume upon the front or exposed portion of the drum's circumference, the remaining portion of the band being kept out of contact with the drum by a suitable guide roller or rollers $b'$. The roughing of the surface of the said drum is effected by forming or providing projections B$^2$ thereon as shown in Fig. 2$^a$. By inspection of said drum through an opening $a^\times$ (Fig. 2) in the dial A$^3$ there will always be seen the line which is formed by the elastic band B′ in laying itself on the exposed surface of the drum, which line constitutes the record of the speed for the period of time that elapses during approximately a half revolution of the drum. As the drum revolves, the portion of the band that leaves the drum is guided by said guide roller or rollers $b'$ round the opposite side of the drum out of contact therewith and is again laid on the drum prior to its reaching the exposed portion of the latter. The record effected by the laying of the said band on the drum as it passes over the exposed portion of the latter will be continually changing in accordance with the variations in the speed of the vehicle and will be continually obliterating itself as it reaches the unexposed portion of the drum where it leaves the same.

In order to effect the laying of the band upon the drum, I provide in close proximity thereto a pulley or guide $b^2$ over or through which the band passes, said pulley or guide being capable of movement longitudinally with respect to the drum. This longitudinal movement of the pulley or guide is effected by a toothed rack $b^3$ which slides in a groove in the back surface of the dial and which carries the said pulley or guide and gears with a toothed pinion $b^4$ receiving its motion from the spindle $A'$. The said pinion $b^4$ has only a portion of its periphery toothed, if the variations in the speed required to be recorded are within narrow limits; say for example, between speeds varying from ten to thirty miles per hour. Spring buffers $b^5$ are provided at the extremities of the rack's strokes for insuring a proper reëngagement of the rack teeth with the teeth of the pinion, when movement of the rack from one or other of its extreme positions is to be effected by said pinion in the reverse direction. By this arrangement of the aforesaid rack and pinion it will be observed that although the drum B is used only for recording speeds varying from ten to thirty miles per hour, the indicating portion of the apparatus can indicate by the pointer $A^2$ much wider limits of speed, say for example from five to sixty miles per hour without in anywise disorganizing the action of the speed recording mechanism, because when the speed exceeds the said thirty miles per hour, the teeth of the pinion $b^4$ will occupy a position of disengagement with the teeth at one end of the rack $b^3$, and similarly when the speed falls below the said ten miles per hour, the teeth of said pinion will occupy a position of disengagement with the teeth at the opposite end of said rack. So soon however as the speed changes to such an extent as to come within the speed of ten to thirty miles per hour the spring buffers $b^5$ will enable the rack teeth to reëngage with the teeth of the pinion, and the recording of the speed on the drum B will then again take place. Obviously by increasing the length of the rack and the drum, and the number of teeth of the pinion the limits of speed recorded can likewise be increased.

The aforesaid drum B is suitably marked with circumferential lines or graduations $b^7$ indicating definite speed intervals in relation to figures engraved on a fixed plate $b^{7\times}$ and indicating say miles. Graduations are also provided on a plate $b^8$ for indicating in relation to said drum, distances, say in yards, traveled by the vehicle from the point where the record on said drum was formed. Thus in the position of the parts shown in Fig. 1 the apparatus indicates that at a distance of 100 yards back from the point where the vehicle is situated at the moment of inspection of the recording apparatus, the speed was 11 miles per hour; likewise at a distance of 400 yards back, the speed was 15 miles per hour; and at a distance of 600 yards back, the speed was 21 miles per hour.

According to the modification illustrated by Figs. 3 to 6, the said rotary member is in the form of a disk $B^\times$ formed with numerous slots $b^9$ with which engage pins or pointers $b^{10}$ at the free ends of movable or pivoted arms $b^{11}$ (Fig. 6) carried by a toothed wheel $b^{12}$. The said pins $b^{10}$ work in the slots $b^9$ with sufficient friction to insure their occupying any position into which they are set without unintentionally shifting. As the disk $B^\times$ and the toothed wheel $b^{12}$ forming part thereof revolve by mechanism receiving its motion from the moving vehicle and gearing with the said toothed wheel $b^{12}$, the pivoted arms $b^{11}$ are shifted to a greater or less extent by means of a device comprising in the example shown a movable incline or inclines $c$ whose position is varied by variations in the speed of the vehicle, thus shifting the pins $b^{10}$ in the slots of the disk $B^\times$ to a corresponding extent, the position which the pins occupy in the said slots being observable through a segmental slot $a^\times$ in the dial $A^3$. This variation in the position of the inclines may be effected in various ways, in the example illustrated I have shown the spindle $A'$ of the speed indicator provided with a toothed disk or pinion $c^2$ (Fig. 5) gearing with teeth $c^3$ on an arm C carrying the said inclines, the said arm being hinged at $c^4$ to the dial $A^3$. In conjunction with the aforesaid movable inclines I may also employ stationary inclines $c^5$ which are so arranged that as the disk $B^\times$ and toothed wheel $b^{12}$ revolve, they will cause the various arms to be shifted so as to bring the pins $b^{10}$ to a normal position or in alinement, at the part of the apparatus which is hidden behind dial $A^3$, in order that they may be ready to be again acted upon by the movable inclines $c$ as the said disk $B^\times$ and toothed wheel $b^{12}$ continue their rotation and once more bring the pins into their exposed position. The said dial is suitably graduated near its periphery for the aforesaid speed indicating pointer $A^2$ to travel over and indicate the speed in miles per hour or otherwise. The said dial is also provided with suitable figures or signs $a$ (Fig. 3) for indicating in connection with a series of concentric lines $b^{13}$ on the disk $B^\times$, the various rates of speed represented by the positions of the aforesaid pins $b^{10}$ that work in the said slots $b^9$, other figures or signs $b^{14}$ being provided for indicating the distances traveled by the vehicle (say in yards) beyond the point at which any particular record is formed. The aforesaid disk B× and toothed wheel $b^{12}$ are preferably adapted to turn about the same axis as that of the speed indicating pointer $A^2$, and in order to render them entirely independent of the axle of the pointer, the disk B× is shown connected with the toothed wheel $b^{12}$ by a hollow stem $b^{15}$ that surrounds, without touching, the axle of the pointer, the said hollow stem $b^{15}$ being supported in a bearing ring $b^{16}$ fixed to the partition $a'$ of the casing of the apparatus. As the disk B× and toothed wheel $b^{12}$ revolve, the said movable arms $b^{11}$ are set into different positions depending on the position of the said movable inclines $c$. By the position of their pins $b^{10}$ relatively to the concentric lines $b^{13}$ on the disk B× representing speed intervals, they record the indications regarding the variations in the speed.

In order to support the pivoted arm C, I provide a guide piece $a^2$ connected with the inner side or back of the dial $A^3$. The teeth $c^2$ $c^3$ work in an analogous manner to that of the rack and pinion referred to in the previous arrangement, resilient limbs or spring buffers $b^5$ being provided for a similar purpose to that set forth in connection with the said previous arrangement.

With this modification of my apparatus the readings of the records would be obtained by observing the position of the aforesaid pins $b^{10}$. For example with the parts in the position shown, it will be seen that at a distance of 25 yards back from the point where the vehicle is situated at the moment of inspection of the recording apparatus, the speed was 19 miles per hour; at a distance of 100 yards back the speed was 17½ miles per hour; and at a distance of 550 yards back the speed was 22 miles per hour.

Although I have described several examples of the manner in which my invention is carried into effect I wish it to be understood that I do not confine myself thereto as other examples within the scope of my invention will readily present themselves to persons acquainted with this class of apparatus.

I wish it to be understood that although I have above described the record-bearing member of my apparatus as being driven by the vehicle or machine whose speed is to be recorded, it may be driven by a clock movement if the speed to be recorded is that for a given duration of time instead of for a given distance traveled by the vehicle.

What I claim and desire to secure by Letters Patent of the United States is:—

1. In apparatus for indicating and recording the speed of vehicles and other machines, the combination of a record-bearing member, means actuated by the speed indicating mechanism of the apparatus for producing a speed-indicating record on said record-bearing member, and means whereby said record is automatically obliterated by the working of the apparatus after a predetermined interval has elapsed, for the purpose specified.

2. In apparatus for indicating and recording the speed of vehicles and other machines, the combination of a record-bearing member having part of its surface unexposed to view, means for imparting motion to said record-bearing member, a device actuated by the speed indicating mechanism of the apparatus for producing a speed indicating record on said record-bearing member, and means whereby said record is automatically obliterated from the record-bearing member by the working of the apparatus as said member reaches its unexposed position for the purpose specified.

3. In apparatus for indicating and recording the speed of vehicles and other machines, the combination of a record-bearing member having part of its surface unexposed to view, means for imparting motion to said record-bearing member from the vehicle or other machine, a device actuated by the speed indicating mechanism of the apparatus for producing a speed indicating record on said record-bearing member, and means whereby said record is automatically obliterated from the record-bearing member by the working of the apparatus as said member reaches its unexposed position for the purpose specified.

4. In apparatus for indicating and recording the speed of vehicles and other machines, the combination of a record-bearing member having part of its surface unexposed to view, means for imparting motion to said record bearing member from a shaft receiving its motion from the vehicle or other machine, a device actuated by the speed indicating mechanism of the apparatus, for producing a speed indicating record on said record bearing member, and means whereby said record is automatically obliterated from the record-bearing member by the working of the apparatus as said member reaches its unexposed position for the purpose specified.

5. In apparatus for indicating and recording the speed of vehicles and other machines, the combination of a rotary record-bearing member having part of its surface unexposed to view, means for revolving said rotary member from a shaft receiving its motion from the vehicle or other machine whose speed is to be recorded, a device actuated by the indicating mechanism of the apparatus for producing a speed indicating record on said record bearing member, means whereby in the event of the speed varying beyond the limits to be recorded by said device, the latter will become temporarily inoperative without disorganizing the speed-indicating portion of the apparatus, and means whereby the said record produced by the said device is automatically obliterated from the rotary record-bearing member by the working of the apparatus as said member reaches its unexposed position for the purpose specified.

6. In appartaus for indicating and recording the speed of vehicles and other machines, the combination of a record bearing member, means for imparting motion thereto, a series of movable pins or pointers carried by said member, a device for shifting said pins or pointers as they are carried along by the said member, and means for varying the position of said device in accordance with the variations in the speed indicating mechanism of the apparatus substantially as and for the purpose specified.

7. In apparatus for indicating and recording the speed of vehicles and other machines, the combination of a rotary record bearing member actuated by the vehicle or other machine whose speed is to be recorded, a series of movable pins or pointers carried by said member, a device for shifting said pins or pointers as they are carried along by the said member, and means for varying the position of said device in accordance with the variations in the speed indicating mechanism of the apparatus substantially as and for the purpose specified.

8. In apparatus for indicating and recording the speed of vehicles and other machines, the combination of a rotary record bearing member actuated by the vehicle or other machine whose speed is to be recorded, a series of movable pins or pointers carried by said member, a device for shifting said pins or pointers as they are carried along by the said member, means for varying the position of said device in accordance with the variations in the speed indicating mechanism of the apparatus, and means whereby the speed recording portion of the apparatus will become temporarily inoperative without detriment to the speed indicating portion, in the event of the indicated speed exceeding in either direction that recorded, substantially as and for the purpose specified.

9. In appartaus for indicating and recording the speed of vehicles and other machines, the combination of a rotary record-bearing member actuated by the vehicle or other machine whose speed is to be recorded, a series of movable pins or pointers carried by said member, a pivoted arm controlled by the speed indicating mechanism of the apparatus, and means forming part of said pivoted arm for setting the pins or pointers in definite positions as they are carried along by the movement of the rotary member substantially as and for the purpose specified.

10. In apparatus for indicating and recording the speed of vehicles and other machines, the combination of a rotary record bearing member actuated by the vehicle or other machine whose speed is to be recorded, a series or pins or pointers carried by said member, a pivoted arm having rack teeth thereon, a toothed disk actuated by the speed indicating mechanism of the apparatus and gearing with said rack teeth of the pivoted arm, and means forming part of said pivoted arm for setting the pins or pointers in definite positions according to the movement said pivoted arm receives from said toothed disk substantially as and for the purpose specified.

11. In apparatus for indicating and recording the speed of vehicles and other machines, the combination of a rotary record bearing member actuated by the vehicle or other machine whose speed is to be recorded, a series of pins or pointers carried by said member, a pivoted arm having rack teeth thereon, a partially toothed disk actuated by the speed indicating mechanism of the apparatus and gearing with said rack teeth of the pivoted arm, spring buffers with which the pivoted arm collides when its teeth become disengaged from the toothed disk at the extremities of the movements of the pivoted arm in either direction, and means forming part of said pivoted arm for setting the pins or pointers in definite positions according to the movement said pivoted arm receives from said toothed disk substantially as and for the purpose specified.

12. In apparatus for indicating and recording the speed of vehicles and other machines, the combination of a rotary record-bearing member actuated by the vehicle or other machine whose speed is to be recorded, a series of pins or pointers carried by said member, a pivoted arm controlled by the speed indicating mechanism of the apparatus, and converging inclines on said pivoted arm through which the said movable pins or pointers are carried by the said rotary member and by which their previous records are obliterated and the pins or pointers re-set into definite positions in accordance with the position assumed by said pivoted arm substantially as and for the purpose specified.

13. In apparatus for indicating and recording the speed of vehicles and other machines, the combination of a rotary record-bearing member actuated by the vehicle or other machine whose speed is to be recorded, a series of pins or pointers carried by said member, a pivoted arm controlled by the speed indicating mechanism of the apparatus, converging inclines on said pivoted arm through which the said movable pins or pointers are carried by the said rotary member, and stationary inclines guiding said pins or pointers between the aforesaid converging inclines substantially as and for the purpose specified.

14. In apparatus for indicating or recording the speed of vehicles and other machines, the combination of a slotted rotary record-bearing member actuated by the vehicle or other machine whose speed is to be recorded, a series of pins or pointers movably carried by the said slotted rotary member, a pivoted arm controlled by the speed indicating mechanism of the apparatus, converging inclines on said pivoted arm through which the said movable pins or pointers are carried by the said rotary member, and stationary inclines guiding said pins or pointers between the aforesaid converging inclines substantially as and for the purpose specified.

15. In apparatus for indicating and recording the speed of vehicles and other machines, the combination of a slotted rotary record-bearing member, actuated by the vehicle or other machine whose speed is to be recorded, a series of pins or pointers movably mounted in the said slotted rotary member, a series of pivoted arms carrying at their free extremities the aforesaid pins or pointers and connected at their pivotal ends with a part movable with said slotted rotary member, a toothed and pivoted arm carried by a non-rotary part of the apparatus and gearing with a toothed disk actuated by the speed indicating mechanism of the apparatus, and means forming part of said toothed and pivoted arm for setting the pins or pointers in definite positions according to the movement said toothed and pivoted arm receives from said toothed disk substantially as and for the purpose specified.

16. In apparatus for indicating and recording the speed of vehicles and other machines, the combination of a slotted rotary disk, a series of pins or pointers movably mounted thereon, a series of pivoted arms carrying at their free extremities the aforesaid pins or pointers and connected at their pivoted ends with a toothed disk co-axially arranged with respect to said slotted disk, a sleeve connecting said disks together, a pinion actuated by the vehicle or other machine whose speed is to be recorded and gearing with said toothed disk, a toothed and pivoted arm carried by a non-rotary part of the apparatus and gearing with a toothed disk actuated by the speed indicating mechanism of the apparatus, and means forming part of said toothed and pivoted arm for setting the pins or pointers in definite positions according to the movement said toothed and pivoted arm receives from said toothed disk substantially as and for the purpose specified.

17. In apparatus for indicating and recording the speed of vehicles and other machines, the combination of a transversely slotted rotary disk having thereon a series of concentric lines crossing the slots, a series of pins or pointers movably mounted in the said slotted rotary disk, a series of pivoted arms carrying at their free extremities the aforesaid pins or pointers and connected at their pivoted ends with a toothed disk co-axially arranged with respect to the said slotted disk, a sleeve connecting said disks together, a pinion actuated by the vehicle or other machine whose speed is to be recorded and gearing with said toothed disk, a segmentally slotted speed indicating dial located in front of said slotted disk, a toothed and pivoted arm carried by said dial and gearing with a toothed disk mounted on the axle of the speed indicating pointer, and means forming part of said toothed and pivoted arm for setting the pins or pointers in definite positions during their passage past the unslotted part of the dial according to the movement said toothed and pivoted arm receives from said toothed disk substantially as and for the purpose specified.

In testimony whereof I have hereunto set my hand in presence of two subscribing witnesses this 13th day of October 1905.

LEONARD EUGENE COWEY.

Witnesses:
T. SELBY SKERDLE,
WALTER J. SKERTEN.